(12) United States Patent
Ekici et al.

(10) Patent No.: US 9,307,491 B2
(45) Date of Patent: Apr. 5, 2016

(54) METHODS AND APPARATUSES FOR INCREASED BATTERY PERFORMANCE IN NETWORKS WITH DIFFERENT DRX CYCLES

(71) Applicant: Broadcom Corporation, Irvine, CA (US)

(72) Inventors: Ozgur Ekici, San Diego, CA (US); Kavya Budugutta Ravikumar, San Digeo, CA (US)

(73) Assignee: Broadcom Corporation, Irvine, CA (US)

( * ) Notice: Subject to any disclaimer, the term of this patent is extended or adjusted under 35 U.S.C. 154(b) by 275 days.

(21) Appl. No.: 13/828,746

(22) Filed: Mar. 14, 2013

(65) Prior Publication Data

US 2014/0204817 A1    Jul. 24, 2014

Related U.S. Application Data

(60) Provisional application No. 61/756,335, filed on Jan. 24, 2013.

(51) Int. Cl.
*H04W 52/02* (2009.01)

(52) U.S. Cl.
CPC .................................. *H04W 52/0216* (2013.01)

(58) Field of Classification Search
CPC .................................................. H04W 76/048
See application file for complete search history.

(56) References Cited

U.S. PATENT DOCUMENTS

| 2005/0148348 | A1* | 7/2005 | Cramby et al. | 455/458 |
| 2011/0128925 | A1* | 6/2011 | Lindoff | H04W 76/048 370/329 |
| 2011/0222451 | A1* | 9/2011 | Peisa et al. | 370/311 |
| 2012/0088502 | A1* | 4/2012 | Chin et al. | 455/433 |
| 2012/0264483 | A1* | 10/2012 | Chin | H04W 68/00 455/552.1 |
| 2012/0269173 | A1* | 10/2012 | Chin et al. | 370/332 |
| 2013/0044709 | A1* | 2/2013 | Adjakple et al. | 370/329 |
| 2013/0070656 | A1* | 3/2013 | Chin et al. | 370/311 |
| 2014/0023047 | A1* | 1/2014 | Aue et al. | 370/336 |
| 2014/0119255 | A1* | 5/2014 | Vannithamby et al. | 370/311 |
| 2014/0162705 | A1* | 6/2014 | De Wit et al. | 455/458 |

FOREIGN PATENT DOCUMENTS

WO    WO 2011056252 A1 *  5/2011

* cited by examiner

*Primary Examiner* — Shaq Taha
*Assistant Examiner* — Jay Vogel
(74) *Attorney, Agent, or Firm* — Brinks Gilson & Lione

(57) ABSTRACT

A system includes a processor and a memory connected with the processor, the memory to store logic. A DRX module also connects with the processor. The DRX module alternatively provides both a CS DRX cycle length and a PS DRX cycle length observed from network configuration. The processor executes the logic stored in the memory to instruct the DRX module to use a longer of a CS DRX cycle length or a PS DRX cycle length.

20 Claims, 3 Drawing Sheets

METHODS AND APPARATUSES FOR INCREASED BATTERY PERFORMANCE IN NETWORKS WITH DIFFERENT DRX CYCLES

TECHNICAL FIELD

This disclosure relates to user equipment (UE) selecting a Discontinuous Receive (DRX) cycle in a network configuring different DRX, e.g., paging monitoring, cycles for circuit and packet switched operations, and more particularly to selecting a DRX cycle to improve battery performance.

BACKGROUND

Network operators can configure discontinuous receive (DRX) cycles differently for Circuit Switched (e.g., CS for voice) and Packet Switched (e.g., PS for data) operations. The DRX cycle determines the periodicity of the paging monitoring process. The longer the DRX cycle, the longer the user equipment (UE) is in a sleep state, and possibly the longer the time before user equipment responds to a page request. In a scenario where the network operator configures different DRX cycles for CS and PS operations, radio specifications require user equipment to use shorter DRX cycle for page monitoring.

BRIEF DESCRIPTION OF THE DRAWINGS

The innovation may be better understood with reference to the following drawings and description. In the figures, like reference numerals can designate corresponding parts throughout the different views.

DETAILED DESCRIPTION

The discussion below makes reference to methods and apparatuses for increasing battery performance in networks specifying different DRX cycle lengths. Page monitoring with shorter DRX cycle lengths can consume more battery power, e.g., about 40% more than if the page monitoring was conducted using a longer DRX cycle length. Depending on the network configuration the battery consumption figure could be different. There are use-case scenarios, however, where page monitoring using shorter DRX cycle length is not needed and therefore may unnecessarily cause higher power consumption without any benefit. In certain situation using the shorter DRX cycle for page monitoring does not provide a benefit for the user equipment, such as a mobile device having a data only (PS only) plan in a network that includes a shorter CS DRX cycle length than the PS DRX cycle length. Additionally, the end user may disable data (e.g., packet data protocol (PDP) de-activation) services in home networks, therefore only monitoring CS DRX cycle length is needed. If data services are disabled, in a scenario where the network configures a shorter DRX cycle for PS services, the UE unnecessarily depletes battery power for monitoring more frequent PS DRX cycle. Similarly, an end user may disable data services while roaming, e.g., via user equipment setting, so the network need not monitor shorter DRX cycle of PS domain.

Figure 1:
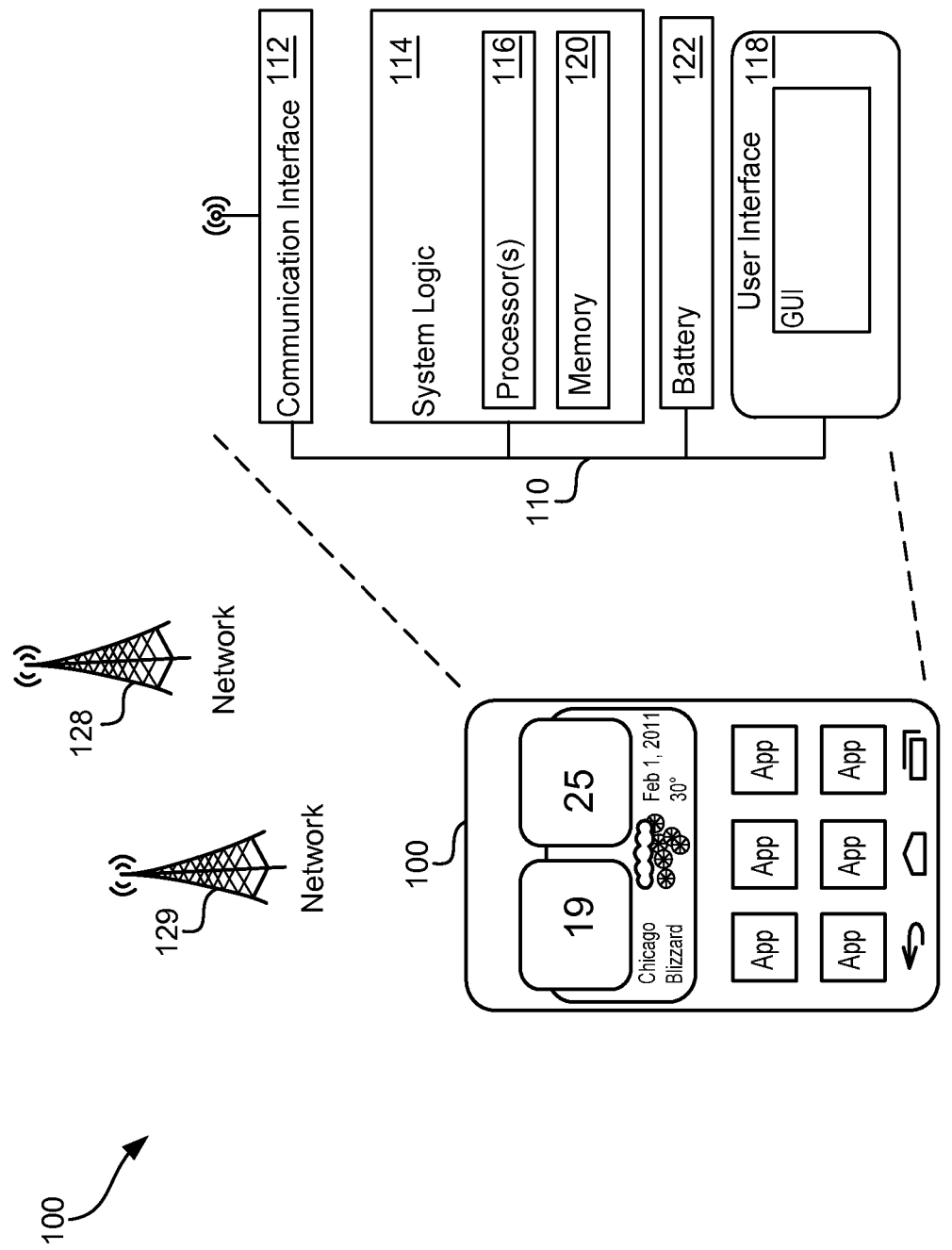
FIG. 1 shows an example of a user equipment

FIG. 1 shows an example of user equipment (UE) 100 for use in networks providing varying DRX cycle length requirements. User equipment may take different forms and have many different functions. As one example, user equipment may include a cellular phone capable of making and receiving wireless phone calls. The user equipment may also include a smartphone that, in addition to making and receiving phone calls, runs general purpose applications. User equipment may be virtually any device that wirelessly connects to a network, including as additional examples a driver assistance module in a vehicle, an emergency transponder, a pager, a satellite television receiver, a networked stereo receiver, a computer system, music player, or virtually any other device. The discussion addresses how to manage DRX cycle lengths of the user equipment.

The user equipment 100 can include a communication interface 112, system logic 114, a user interface 118, and a battery 122. The system logic 114 may include any combination of hardware, software, firmware, or other logic. The system logic 114 may include software code responsible for radio protocols such as radio resource control (RRC) and non-access stratum (NAS). The system logic 114 may be implemented, for example, in a system on a chip (SoC), application specific integrated circuit (ASIC), or other circuitry. The system logic 114 is part of the implementation of desired functionality in the user equipment 100. In that regard, the system logic 114 may include logic that facilitates, as examples, running applications, accepting user inputs, saving and retrieving application data, establishing, maintaining, and terminating cellular phone calls, wireless network connections, Bluetooth connections, or other connections, and displaying relevant information on the user interface 118. The user interface 118 may include a graphical user interface, touch sensitive display, voice or facial recognition inputs, buttons, switches, and other user interface elements.

The communication interface 112 may include one or more transceivers. The transceivers may be wireless transceivers that include modulation/demodulation circuitry, amplifiers, phase locked loops (PLLs), clock generators, analog to digital and digital to analog converters and/or other logic for transmitting and receiving through one or more antennas, or through a physical (e.g., wireline) medium. The transmitted and received signals may adhere to any of a diverse array of formats, protocols, modulations, frequency channels, bit rates, and encodings. As one specific example, the communication interface 112 may support transmission and reception under the Universal Mobile Telecommunications System (UMTS).

Existing communication standards define a discontinuous receive mode (DRX) for the user equipment 100. One goal of DRX is to extend a life of a battery 122 by not constantly monitoring the radio channels, for example, the radio resource control channels during the entire time that the user equipment 100 is assigned the radio resource. Instead, the user equipment 100 may regularly enter power saving states that significantly reduce power consumption of the user equipment 100. In the power saving states, the radio frequency (RF) modems and other system logic are turned off; consuming significantly less power. DRX mode is applicable to a dormant state, also known as IDLE or STAND-BY states, where the UE is monitoring the paging channel for incoming messages.

The DTX modes can be beneficial when the user equipment 100 has relatively low activity on the radio frequency (RF) channel that may result because the user equipment 100 is carrying out functions that only infrequently monitor paging channel.

Wireless specifications of the user equipment 100, e.g., $3^{rd}$ Generation Partnership Project (3GPP) for Universal Mobile Telecommunications Systems (UMTS), however, specify DRX cycle lengths, e.g., sleep state lengths, for receive operations like page monitoring. In commercial networks, where shorter CS DRX cycle length is configured compared to PS DRX cycle length, a mobile device operating in a scenario in which CS monitoring is not needed, can experience significantly more current consumption with no apparent benefit. In other practical network configurations, where a shorter PS DRX cycle length is configured compared to CS DRX cycle length, a mobile device operating in a scenario in which PS monitoring is not needed can also experience drastically higher current consumption with no apparent benefit. More current consumption can mean more drain of the equipment's battery power and faster depletion of the battery 122. The described methods and apparatuses can help decrease the battery drain, e.g., by determining when the shorter PS or CS DRX cycle length is not needed.

In one implementation, the system logic 114 includes one or more processors 116 and a memory 120 to manage DRX cycle lengths. The memory 120 stores, for example, managing instructions that the processor 114 executes in accordance with the system logic 114. The system logic 114 may control the user equipment 100 to use the CS DRX cycle length or to use the PS DRX cycle length, as described in more detail below.

Figure 2:
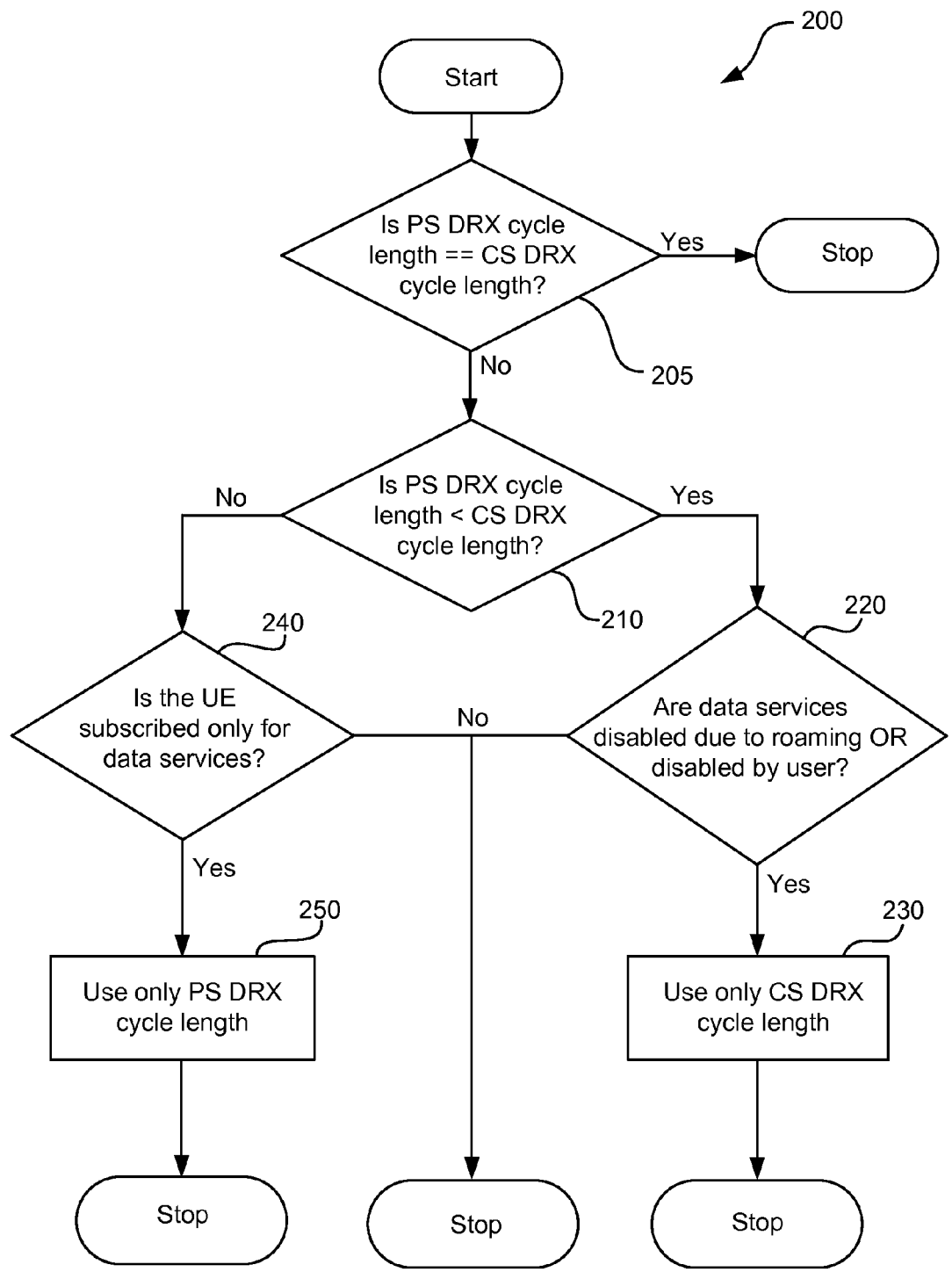
FIG. 2 is a flow chart of an exemplary logic for managing the use of DRX cycle lengths.

FIG. 2 is a flow chart of logic 200, e.g., implemented by the system logic 114, for managing the use of DRX cycle lengths. The logic 200 can be executed, e.g., with the managing instructions 114. The DRX cycle lengths are domain specific. Some networks configure different DRX lengths for different domains (e.g., CS and PS domains), and others the same lengths. The logic 200 can determine if for an operation of the user equipment 100 the PS DRX cycle length equals the CS DRX cycle length (205). If the PS DRX cycle length equals the CS DRX cycle length then system logic 114 need not further manage selection of the DRX cycle lengths at that time.

If the PS DRX cycle length does not equal the CS DRX cycle length the logic 200 can determine if the PS DRX cycle length is less than the CS DRX cycle length (210). If the PS DRX cycle length is less than the CS DRX cycle length, the logic 200 can determine if the data services of the user equipment 100 are disabled, e.g., due to roaming or turned off by a user (220). If the data services of the user equipment 100 are disabled, then the user equipment 100 can be operated using the CS DRX cycle length (230), which is longer compared to PS DRX cycle length. The user equipment 100 can passively select the CS DRX cycle. That way the longer CS DRX cycle length is used, allowing for a longer sleep cycle and less drain on the battery 122 for better batter performance. The shorter PS DRX cycle length is not used at this time. If the data services are not disabled, then the system logic can maintain use of the PS DRX cycle length for the user equipment 100.

If the PS DRX cycle length is greater than the CS DRX cycle length, then the logic can determine if the user equipment 100 is subscribed only for data services (240). If the user equipment 100 is subscribed only for data services, and e.g., not voice services, then the system logic 114 can manage the user equipment 100 to use the longer length PS DRX cycle length allowing for a longer sleep cycle and less drain on the battery 122 (250). The user equipment 100 can passively select the PS DRX cycle. The shorter CS DRX cycle is not used at this time. If the user equipment 100 is not subscribed only for data services, then the system logic can maintain use of the CS DRX cycle length for the user equipment 100.

Figure 3:
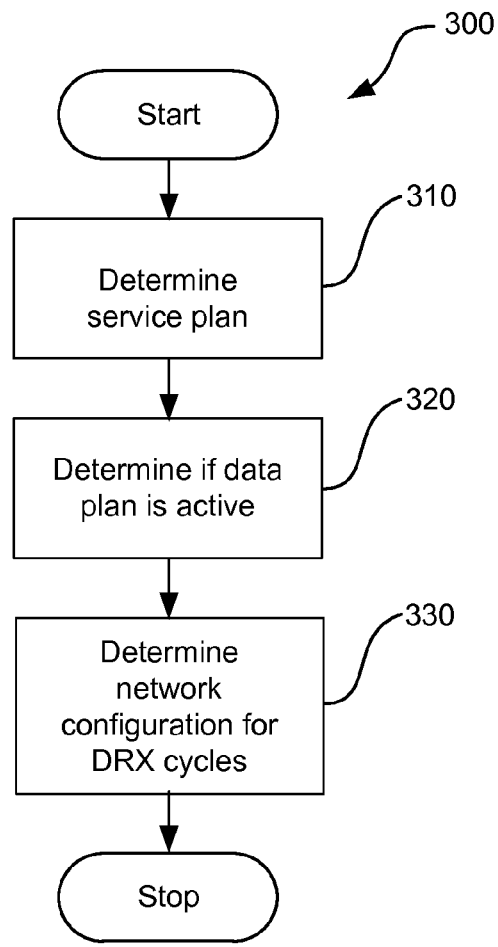
FIG. 3 is a flow chart of an exemplary algorithm for determining a status of the user equipment

FIG. 3 is a flow chart of an exemplary logic 300 for determining a status of the user equipment 100. The system logic 114 can execute the logic 300 to determine a type of service plan that the end user is using (310). For example, the system logic determines if the current plan is a PS only data plan, or not. The user equipment 100 can obtain plan information, e.g., by receiving a certain service reject messages from the network 128, 129, but the UE is not limited to using service reject messages to determine the data plan characteristics. The UE can use any other method to find out the service details. If the end user deactivated the data connection the user equipment 100 can receive the "data services off" command from the user interface 118. Additionally or alternatively, the user equipment 100 can receive a service reject message or an error message from the network if the user equipment attempts to communicate with network using services that are not subscribed. Additionally or alternatively, the data services may be deactivated, either automatically or by the user, while roaming. By monitoring these statuses and/or error messages the system logic 114 of the user equipment 100 can determine whether or not the data services is activated (e.g. data service is on) (320) on the device or if the device is attempting to access a service that end user is not subscribed for.

The network 128, 129 can configure different DRX cycle lengths for its UTRAN (Universal Mobile Telecommunications System (UMTS) Terrestrial Radio Access Network) paging monitoring. Based on the end user data plan details and the status of the data plane, e.g., if the data services are turned off or not, the system logic 114 can determine if shorter DRX cycles are needed. For example, if data services are disabled due to roaming or by the user, or if the user equipment 100 is subscribed only for data services, the shorter DRX cycle length for page monitoring may not be needed. The system logic 114 can ignore the shorter DRX cycle lengths, e.g., in favor of using longer DRX cycle lengths which can provide for longer sleep states, if the shorter DRX cycle lengths are not needed for operation of the user equipment 100, thereby saving battery life.

Figure 4:
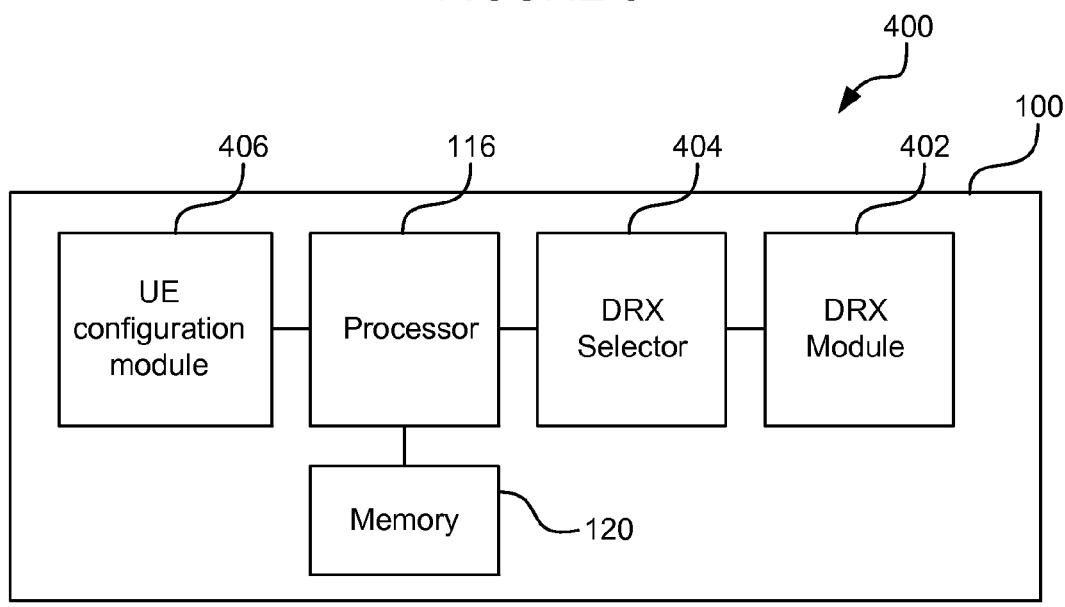
FIG. 4 is a block diagram of an exemplary system for controlling the use of different DRX cycle lengths.

FIG. 4 is a block diagram of an exemplary system 400 for controlling the use of different DRX cycle lengths. In addition to the processor 116 and memory 120, e.g., discussed earlier, the system 400 may include a DRX module 402 and DRX selector 404 connected with the processor 116. The DRX module 402 may alternatively provide to the user equipment 100 both a CS DRX cycle length and a PS DRX cycle length observed from a network operator configuration. The processor 116 can execute logic stored in the memory 120 to instruct the DRX module 402 to use a CS DRX cycle length or a PS DRX cycle length in a way that can provide increased battery performance, e.g., described above.

The DRX selector 404 can provide selection information of the CS DRX cycle length or the PS DRX cycle length to the DRX module 402, e.g., based on the logic executed by the processor 116. The logic can determine whether to use the CS DRX cycle length or the PS DRX cycle length, e.g., as described above. The determination can be based on the subscribed services of the user equipment 100 and the configured CS and PS DRX cycle length of the network operator. If a shorter CS or PS DRX cycle is not needed for the subscribed or non-subscribed services, then the longer CS or PS DRX cycle length can be used, regardless of the standard requirements. A user equipment configuration module 406 can store information about subscribed for and unsubscribed for services to aid in the determination of DRX cycle lengths.

In a network configuration where CS DRX cycle lengths and PS DRX cycle lengths are different, standards such as 3GPP TS 25.304 section 8.3 for UTRAN/WCDMA may require the user equipment 100 to monitor the shorter DRX cycles. According to 3GPP TS 25.304 section 8.3, the user equipment 100 may be attached to different CN domains with different CN domain specific DRX cycle lengths. The user equipment 100 can store each CN domain specific DRX cycle length for each CN domain the user equipment 100 is attached to and use the shortest of those DRX cycle lengths.

The standards, however, do not usually consider consumer trends, e.g., PS only data plans, or take into account the possible settings that the user equipment 100 may encounter, e.g., disabling data services when roaming. Therefore, the systems and methods herein can utilize such information to help optimize the use of CS DRX cycle lengths and PS DRX cycle lengths in the user equipment 100 to improve battery life.

Network operators have different motivations to configure CS DRX and PS DRX cycles in their network configurations. For example, some network operators, may prefer to have shorter CS DRX cycle lengths so that call set-up time for mobile terminated CS/voice calls is shorter; improving end user perceptions and experience, shorter delay during connection, in the wireless network. The following table includes an exemplary DRX configuration of a sample network where CS_DRX=6 and PS_DRX=7:

```
value SysInfoType1 ::= {
    cn_DomainSysInfoList {
        {
            cn_DomainIdentity d_CN_DomainIdentity_cs_domain
            cn_DRX_CycleLengthCoeff 6
        },
        {
            cn_DomainIdentity d_CN_DomainIdentity_ps_domain
            cn_DRX_CycleLengthCoeff 7
        }
    },
```

Other network operators may prefer to have shorter PS DRX cycle lengths to match their connected mode DRX cycles (CELL_PCH etc.) in IDLE state and also to reduce the call set-up time for PS connections. The following is a sample network configuration from another network where CS_DRX=7 and PS_DRX=6:

```
value SysInfoType1 ::= {
    cn_DomainSysInfoList {
        {
            cn_DomainIdentity d_CN_DomainIdentity_cs_domain
            cn_DRX_CycleLengthCoeff 7
        },
        {
            cn_DomainIdentity d_CN_DomainIdentity_ps_domain
            cn_DRX_CycleLengthCoeff 6
        }
    },
```

In 3G wireless systems like WCDMA, a DRX cycle, also known as paging cycle, includes a function of DRX cycle length coefficients mentioned in the example below. For example, a DRX cycle of DRX cycle length coefficient 7 can be calculated as: $2^7 * 10$ ms=1280 ms. Regardless of the different DRX cycle length coefficients, the network operators may assume that user equipment 100 includes similar configuration/plans using both CS and PS resources. There are many scenarios where monitoring with a shorter DRX cycle length may not benefit the user equipment 100. But the user equipment 100 is programmed as a default to monitor paging of the shorter DRX cycle based on the network configuration. In such scenarios, as described above the user equipment 100 can determine the DRX cycle coefficient to use and override the default which can result in a longer battery life. In the following exemplary configurations to achieve a longer battery life the user equipment 100 can override the default of using the shorter of the PS DRX or CS DRX cycle lengths. Other situations may also exist.

For example, the user equipment 100 may be operating on a data only plan. Data only plans are becoming more popular where the functionality of voice call is partially eclipsed by instant messaging. As a response to this demand, the network operators offer data only contracts, e.g. Instant Messenger plans. Also, plans sold with wireless modem cards can be considered as data only plans. If a wireless device is using a data only plan, then the user equipment 100 need not monitor paging cycles for CS calls from a Mobile Switching Center (MSC). However, the user equipment 100 by default performs CS and PS registrations and therefore may be forced to monitor CS paging despite DRX cycle length for CS domain being shorter than the DRX cycle length for PS. In this case, the system logic 114 can determine that the longer PS DRX cycle length can be used instead of the shorter CS DRX cycle length and battery power may be saved.

Another scenario is where data services are disabled while roaming. Due to high roaming charges the data services on the user equipment 100 is by default disabled while roaming. If an end user roams to a network that has shorter a DRX cycle for PS domains, then the user equipment 100 can experience higher battery consumption without a benefit for end user of the user equipment 100. For example, if the battery consumption values for DRX7 and DRX6 are compared, by unnecessarily monitoring paging cycles in a DRX6 configuration rather than a DRX7 configuration, IDLE mode current consumption might increase by about 40%. The exact amount of current consumption increase is network configuration dependent. In this case where the PS domain is not being used, the system logic 114 can determine that the longer CS DRX cycle length can be used and battery power may be saved.

In another use case scenario, the data services can be disabled by an end user preference. For example, for the weekends or holiday seasons where the end user is not interested in the business updates/emails but desires to be reached for voice calls for other matters. In a network configuration with shorter PS DRX cycle length, the user equipment can continue to experience about 40% higher battery drain due to unnecessary monitoring PS paging cycle. In this case, the system logic 114 can determine that the PS domain is not needed and the longer CS DRX cycle length can be used to save battery power. Methods and apparatus regarding the system logic 114 are described in FIG. 2 for example, The techniques described above are not limited to any particular communication standard, DRX parameters, control or communication channels, frame structures, or slot structures. Instead, the techniques described above are applicable to any shift of DRX patterns to achieve any desired efficiency goal in a communication system.

The methods, devices, techniques, and logic described above may be implemented in many different ways in many different combinations of hardware, software or firmware or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

While various embodiments have been described, many more embodiments and implementations are possible. Accordingly, the description is not to be restricted.

What is claimed is:

1. A device, comprising:
   a processor;
   a memory connected with the processor, the memory configured to store a logic; and
   discontinuous receive (DRX) module circuitry connected with the processor, the DRX module circuitry executable to alternatively provide both a circuit switched (CS) DRX cycle length and a packet switched (PS) DRX cycle length observed from a network operator configuration, the processor configured to execute the logic stored in the memory to instruct the DRX module circuitry to determine a longer of a CS DRX cycle length or a PS DRX cycle length;
   the processor further configured to also execute the logic stored in memory, to determine only one of data service or voice service is available at the device, and the processor further configured to ignore the PS DRX cycle length in response to data service being unavailable at the device, and the processor further configured to ignore the CS DRX cycle length in response to voice service being unavailable at the device.

2. The device of claim 1, further comprising a DRX selector circuitry connected with the DRX module circuitry, where the logic is configured to control the DRX selector circuitry to select the CS DRX cycle length or the PS DRX cycle length.

3. The device of claim 1 further including a battery, where a power of the battery lasts longer by selection by the processor of the longer of the CS DRX cycle length or PS DRX cycle length than if the longer CS DRX cycle length or PS DRX cycle length was not selected.

4. The device of claim 1 where the processor is configured to instruct the DRX module circuitry to use the CS DRX cycle length and not the PS DRX cycle length if the CS DRX cycle is longer than the PS DRX cycle length and the data service is determined by the processor to be disabled.

5. The device of claim 1 where the processor is configured to instruct the DRX module circuitry to use only the PS DRX cycle length and not the CS DRX cycle length if the PS DRX cycle length is longer than the CS DRX cycle length and only the data service is subscribed for, not the voice service.

6. The device of claim 1 further comprising a configuration module circuitry configured to store information about end user subscribed services.

7. The device of claim 6 where the processor is configured to determine whether to use the PS DRX cycle length or the CS DRX cycle length according to the stored information about subscribed for data services and voice services and the longer of the PS DRX cycle length and the CS DRX cycle length.

8. A method, comprising:
   comparing, using a wireless device of an end user, a packet switched (PS) discontinuous receiver (DRX) cycle length with a circuit switched (CS) DRX cycle length for a network; determining with the wireless device if a data service and a voice service are available at the wireless device; operating the wireless device with the CS DRX cycle length and not the PS DRX cycle length in response to the CS DRX cycle length being greater than the PS DRX cycle length and the data service being determined by the wireless device to be unavailable; and operating the wireless device with the PS DRX cycle length and not the CS DRX cycle length in response to the PS DRX cycle length being greater than the CS DRX cycle length and the voice service being determined by the wireless device to be unavailable.

9. The method of claim 8 further including storing data service information in the wireless device indicating whether the data service is disabled.

10. The method of claim 9 further including determining if the data service is disabled from the data service information or from an input from a user.

11. The method of claim 9 further including determining with the wireless device if the voice service is subscribed by the end user by checking an error message from the network.

12. A device, comprising:
   a communication interface to send communication signals to a network and to receive communication signals from the network, the network providing a first receive sleep cycle length and a second receive sleep cycle length; and
   system logic circuitry connected with the communication interface, the system logic circuitry to determine availability of a voice service and a data service at the device, the first receive sleep cycle length being associated with the voice service, and the second receive sleep cycle length being associated with the data service;
   the system logic circuitry configured to select, for receive operations, a longer of the first receive sleep cycle length and the second receive sleep cycle length contingent upon the determination by the system logic circuitry of availability of the associated voice service and the data service, the first receive sleep cycle length selected as longer based on the voice service being determined as available at the device, and the second receive sleep cycle length selected as longer based on determination by the system logic circuitry that the data service is available at the device.

13. The device of claim 12 where the receive operations comprise a paging operation.

14. The device according to claim 12 where the receive first sleep cycle length comprises a circuit switched (CS) discontinuous receive (DRX) cycle length and the second receive sleep cycle length comprises a packet switched (PS) DRX cycle length.

15. The device of claim 14 where the system logic circuitry selects the CS DRX cycle length and not the PS DRX cycle length if the CS DRX cycle is longer than the PS DRX cycle length and the data services are turned off at the device.

16. The device of claim 15 further including a user interface circuitry connected with the system logic circuitry, the user interface circuity to provide an input for disabling the data service.

17. The device of claim 15 where the data service is automatically disabled upon the device roaming.

18. The device of claim 14 where the system logic circuitry selects the PS DRX cycle length and not the CS DRX cycle length if the PS DRX cycle length is longer than the CS DRX cycle length and only the data service is subscribed for, not the voice service.

19. The device of claim 12 further including a battery connected with the communication interface, where a power of the battery lasts longer by selecting the longer sleep cycle length than if the longer sleep cycle length was not selected.

20. The device of claim 1 wherein the PS DRX cycle length is ignored in response to the PS DRX cycle length being shorter than the CS DRX cycle length.

* * * * *

UNITED STATES PATENT AND TRADEMARK OFFICE
CERTIFICATE OF CORRECTION

PATENT NO. : 9,307,491 B2
APPLICATION NO. : 13/828746
DATED : April 5, 2016
INVENTOR(S) : Ozgur Ekici and Kavya Budugutta Ravikumar Page 1 of 1

It is certified that error appears in the above-identified patent and that said Letters Patent is hereby corrected as shown below:

On the Title Page

At Item (72) Inventors, after "Ravikumar" delete "San Digeo" and insert --San Diego--.

Signed and Sealed this
Thirty-first Day of May, 2016

Michelle K. Lee
*Director of the United States Patent and Trademark Office*